United States Patent

Tokarz

[11] 4,154,684
[45] May 15, 1979

[54] APPARATUS TO FACILITATE BURNING OF A LAYER OF OIL, PARTICULARLY OIL SPILLS

[76] Inventor: Richard D. Tokarz, 4811 Laurel Dr., West Richland, Wash. 99352

[21] Appl. No.: 827,970

[22] Filed: Aug. 26, 1977

[51] Int. Cl.² ............................................. C02B 9/02
[52] U.S. Cl. ........................ 210/242 R; 210/DIG. 26; 210/DIG. 25; 431/2
[58] Field of Search ...................... 431/2, 4, 7, 8, 170; 210/DIG. 26, DIG. 25, 242

[56] References Cited

U.S. PATENT DOCUMENTS

| 3,659,715 | 7/1969 | Shaler | 210/DIG. 26 |
| 3,663,149 | 5/1972 | Heagler | 431/2 |
| 3,698,850 | 10/1972 | Sparlin | 431/2 X |
| 3,795,315 | 3/1974 | Preus | 210/DIG. 26 |
| 4,072,794 | 2/1978 | Tomita et al. | 210/DIG. 26 |

OTHER PUBLICATIONS

Chemical Treatment of Oil Slicks, Edison Water Quality Laboratory, Mar. 1969.

*Primary Examiner*—Roy D. Frazier
*Assistant Examiner*—Peter A. Aschenbrenner
*Attorney, Agent, or Firm*—Wells, St. John & Roberts

[57] ABSTRACT

Apparatus for facilitating the burning of an oil spill in situ is described which utilizes a plurality of closely associated floating facilitors. The facilitators are constructed of a highly insulative and porous material for subdividing the oil spill into separably definable oil columns that are substantially thermally insulated from the body of water to minimize heat transfer between the body of water and the oil spill.

12 Claims, 6 Drawing Figures

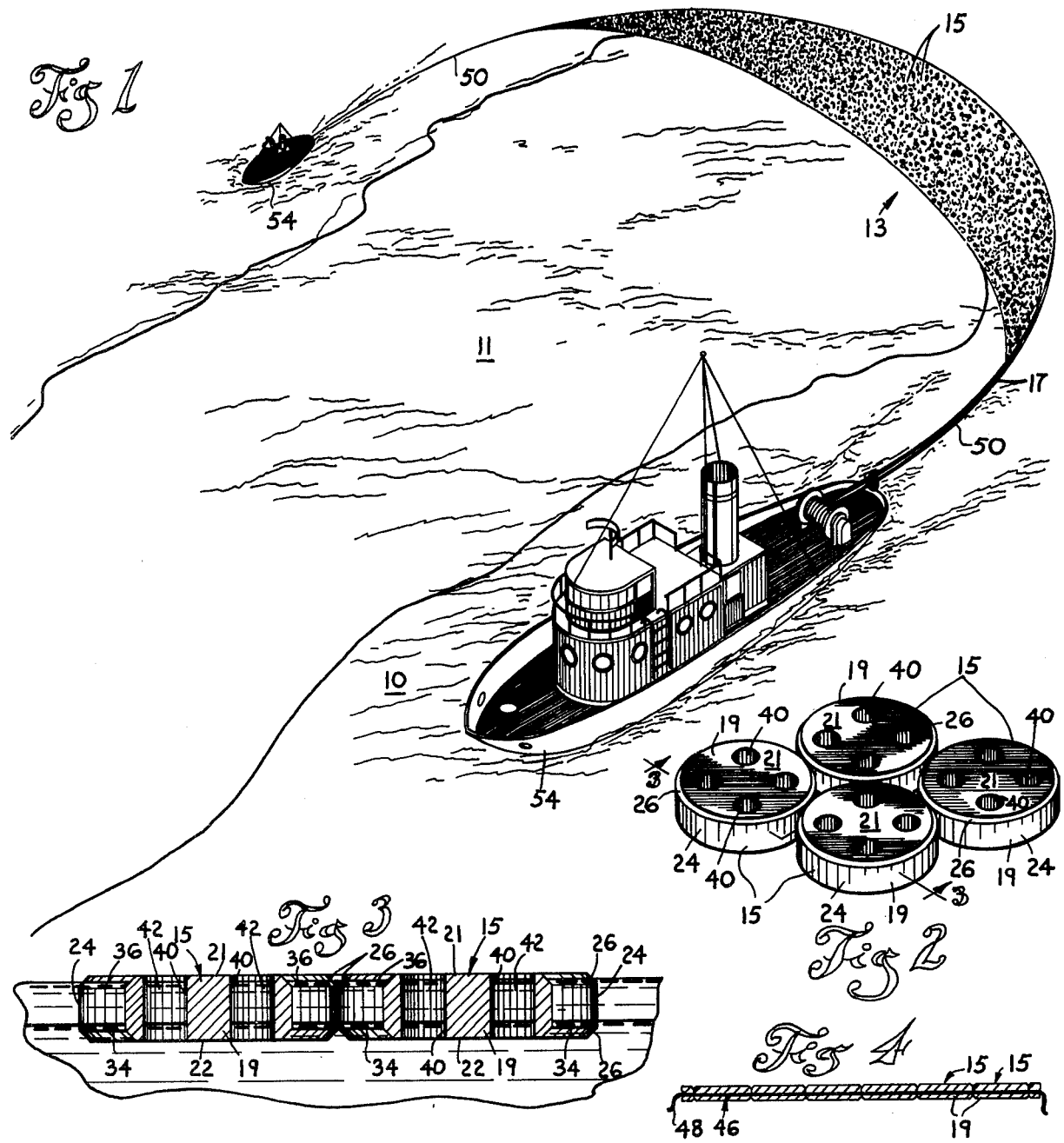
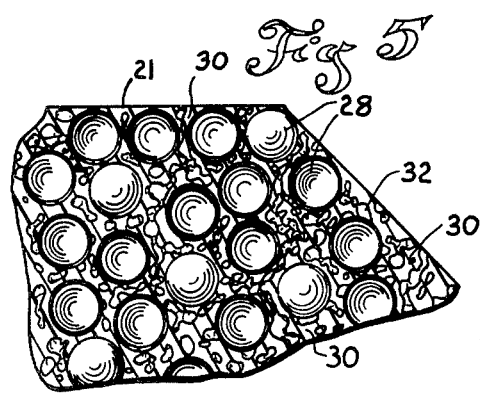
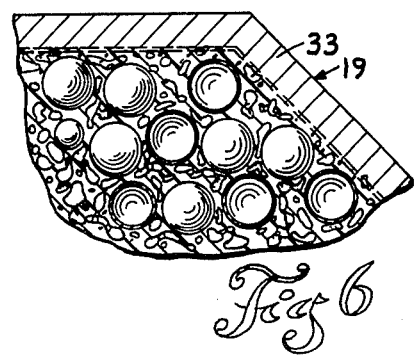

APPARATUS TO FACILITATE BURNING OF A LAYER OF OIL, PARTICULARLY OIL SPILLS

BACKGROUND OF THE INVENTION

This invention relates to methods and apparatus for removing oil spills.

Considerable concern has been given to techniques for removing oil spills from bodies of water and surrounding beaches resulting from large amounts of oil being discharged from large oil tankers as a result of a collision or like disaster. The resulting polution of the water and land mass has long term serious detrimental effects on the wildlife, ecology and economy of large areas. Intensive and varied removal efforts by private and governmental agencies have been widely explored.

To date three general methods have been utilized with limited degree of success. First, physical absorption techniques have been developed which rely essentially upon the ability of material to absorb the oil. Such compositions as expanded mica, diatomaceous earth, talcs and other like materials have been applied to the spill to absorb the oil. To be even marginally effective large amounts of the material must be utilized. Furthermore, it is very difficult and expensive to process the material to remove the absorbed oil and material from the water or surrounding area. Such material is difficult to pump, skim or screen.

The second method involves the use of a dispersing agent such as emulsifier or surfactant. Such methods depend upon the action of the dispersent material to fracture the oil slick into relatively small globules which will then sink or may be carried from the main body of the oil slick by wave or tide action. However, such dispersents are frequently detrimental to marine and wildlife and sometimes create a greater hazard than the oil slick itself, particularly when the material is washed ashore.

The third general method includes techniques for facilitating the burning of the oil in situ. Some experimentation has been done in the application of finely divided, particulate material to the oil slick or spill to increase the ability of the oil layer to burn. An example of such a procedure is disclosed in U.S. Pat. No. 3,556,698 granted on Jan. 19, 1971. The process provides for the application of certain particulate solids to the spill to increase the ability of the oil to be ignited and combusted more completely. However, such techniques at best have been only partially successful.

One of the principal objects of this invention is to provide apparatus for application to oil spills to substantially increase the ability of the oil to be completely burned in situ.

An additional object of this invention is to provide apparatus for treating oil spills that is capable of facilitating the burning of a wide variety of oils, even heavy crude oils, with considerable efficiency.

A still further object of this invention is to provide apparatus for treating oil slicks with a material that may be readily ignited and capable of efficiently burning the oil.

A still further object of this invention is to provide apparatus that is relatively inexpensive for treating oil spills to render the oil highly burnable.

BRIEF DESCRIPTION OF THE DRAWINGS

A preferred and alternate embodiment of this invention is illustrated in the accompanying drawings, in which:

FIG. 1 is a pictorial view showing a layer of oil in the form of an oil spill on a body of water that is being treated with an apparatus which is the subject of this invention, in which the apparatus includes a plurality of oil burning facilitators;

FIG. 2 is a isometric enlarged view of several of the facilitators in close proximity to each other to facilitate the burning of the oil spill;

FIG. 3 is a vertical cross-sectional view taken along line 3—3 in FIG. 2;

FIG. 4 is a vertical cross-sectional view of several facilitators showing interconnecting thread between the two facilitators to secure the interior structure thereof;

FIG. 5 is a fragmentary enlarged view of the interior of a facilitator showing the interior structure thereof; and FIG. 6 is a fragmentary enlarged view of a vertical cross section of an alternate form of a facilitator having a layer of wax thereon.

DETAILED DESCRIPTION OF A PREFERRED EMBODIMENT

Referring in detail to the drawings, there is illustrated in FIG. 1 a body of water designated with the numeral 10 having a layer of oil or oil spill or slick 11 thereon. An apparatus 13 which is the subject of this invention is provided for facilitating the burning of the oil spill 11 in situ. The apparatus 13 is designed to be able to facilitate the burning of a wide variety of oils having a wide variety of viscosities and vapor temperatures. Frequently the body of water 10 has a rather low temperature between 32° and 50° F. whereas the vapor temperature of the oil components greatly exceed 120°. The body of water serves as a very large heat sink maintaining the oil temperature far below the vaporization temperature of the various components of the oil.

The apparatus 13 is designed to sufficiently isolate the oil adjacent the burning surface from the body of water so that such layer may be heated to a temperature above the vaporization temperature of the various components. Additionally the apparatus 13 is designed to prevent heat from the burning oil from heating the water at the water surface above its boiling temperature. Should the water be heated above its boiling temperature then steam or water vapor will form which passes up through the oil layer interfering with the combustion process and frequently extinguishing the flame. Consequently the apparatus 13 is designed to substantially thermally insulate the burning layer of oil from the water while at the same time enabling the oil to readily flow to the burning surface to perpetuate the continuing burning of the oil until the oil is exhausted.

The apparatus 13 includes a plurality of burning facilitators 15 that are confined in close spatial relationship to each other by confining means 17 with the facilitators 15 subdividing the oil spill into distinct separate locations. The confining means 17 maintains the facilitators 15 in sufficiently close proximity to each other to substantially overlie the body of water beneath the burning oil and thereby insulate the burning oil surface from the water surface therebeneath.

Each facilitator 15 includes a rigid body 19 that has lateral dimensions greater than the height dimensions to provide floating stability of the body on the body of water. The bodies may be of various shapes; however, disk shape is preferable. Each body 19 has spaced face surfaces 21 and 22 that serve as either top surface and bottom surfaces. Each body has a side surface 24 that extends around the periphery of the body. Preferably the thickness of the body between the face surfaces 21 and 22 is between one half inch and one inch in thickness. The lateral dimensions are preferably at least twice the thickness. Preferably the side surface 24 extends inward at an inclined angle to the face surfaces 21 and 22. The beveled surfaces 26 serve as flame support surfaces.

Each body 19 (FIG. 5) is constructed of a composite rigid structure including a large number of hollow ceramic microspheres 28 that are held together by a bonding agent 32. Preferably the rigid structure is expanded during formation by conventional techniques to form large numbers of irregular pores or passageways 30 extending throughout the body 19 between the microspheres 28 with the bonding agent 32 appearing as a lattice network interconnecting the microspheres 28. Each body 19 is molded and cured into the desired shape. Preferably the microspheres are formed of a silica material. A satisfactory material for the microspheres 28 is presently marketed under the brand name "Eccospheres". The surfaces of the pores 30 are oleophilic enabling the oil to permeate the body 19. The bodies 19 have a specific gravity less than water so as to cause the facilitators 15 to float on the body of water 10. The height or thickness of each facilitator 15 is sufficient to cause a face surface 21, 22 to extend upwardly through the oil with at least a portion of a face surface 21, 22 exposed to the atmosphere in floating stability.

Preferably the bonding material 32 is an epoxy resin adhesive that forms a crystalline carbon structure when burned so that the body 19 will eventually disintegrate should it be washed ashore by the wave action. The bodies 19 are constructed of materials that are capable of withstanding temperatures in excess of 800° F. without degrading.

Each of the bodies 19 is a highly thermally insulative material that is capable of substantially insulating the water from the burning surface of the oil layer to prevent vaporization of the water and to prevent the water from cooling the oil.

In an alternate embodiment as illustrated in FIG. 6, each of the bodies 19 may be coated or impregnated with a highly flammable material 33 such as wax to facilitate the initial ignition of the oil layer. Additionally the wax 33 serves to protect the body 19 during storage to prevent its contamination while at the same time providing a very useful starting material to initiate the oil combustion.

The confining means 17 further brings the facilitators 15 sufficiently close to each other to subdivide the oil layer into a plurality of vertical oil columns 34 that are sufficiently separate and distinct from each other to thermally insulate the columns while enabling oil to flow into the oil columns either beneath the facilitators 15 or along the sides 24 of the facilitators. Each of the oil columns 34 has an upper surface 36 that is exposed to the atmosphere to support a flame. Beveled surfaces 26 provide for complementary surfaces on adjacent facilitators to support or protect a flame therebetween. Furthermore the confining means 17 further brings the facilitators 15 sufficiently close to each other that flames on the facilitators complement each other to sustain the burning of the oil column 34 therebetween.

Each oil column 34 is sufficiently separate that the column is thermally insulated from the water and from the other oil columns 34 so that the column may be sufficiently heated to enable a very vigorous burning to occur. If a heavy crude oil has been spilled, then the lighter components will burn first with the temperature increasing to burn even the heavy components. During vigorous burning the heavier components are frequently thrown into the air by the rapid expansion of the lighter components which increases the efficiency of the process. Furthermore, the oil column 34 draws oil into the column because of the temperature gradiant within the column to feed the flame until the oil is exhausted.

Preferably a good majority of the facilitators 15 include formed vertical apertures 40 extending between the face surfaces 21 and 22 to form interior column cavities to define interior oil columns 42. The number of internal vertical cavities 40 may be varied depending upon the nature of the oil to be burned and various other conditions. The oil columns 34 and 42 are sufficiently insulated to enable the oil in the columns 34 and 42 to be heated to an elevated temperature to provide excellent burning. It has been found that such a technique is highly efficient and is capable of burning almost all of the oil leaving a rather small residue that clings to the facilitators 51.

The confining means 17 may include a partial or total peripheral boom 44 (FIG. 1) that maintains the facilitators 15 in rather close proximity. Preferably the boom 44 is constructed of similar material as the facilitator 15. In one embodiment the boom 44 is comprised of blocks between 1 and 2 feet in length and between 6 and 8 inches in height and width that are interconnected by a cable to form a barrier.

Alternatively confining means may include interconnecting means 46 (FIG. 4) that extend between the facilitators 15 for holding the facilitators in rather fixed relation to each other to define the oil columns 34 therebetween. Interconnecting means 46 (FIG. 4) may include fine wire fiber or thread elements 48 that extend between or through the facilitators 15 to substantially interconnect the various facilitators 15 to each other to form a matrix in which the spacing between the facilitators 15 is maintained rather constant to provide for the distinct oil columns 34 while enabling the oil to flow between the facilitators 15 to continually feed the apparatus oil to provide for continuing burning.

Depending upon the desired application, it may be desirable to utilize oil guides 50 for guiding or feeding the oil layer to the apparatus 13. The oil guides 50 may be positioned so that a moving body of water such as a river will carry the oil spill in a particular direction with the guide 50 converging the oil into the apparatus 13. Buoys may be utilized to anchor the oil guides 50 and the apparatus 13 downstream of the oil slick to enable the oil slick to flow into the apparatus 13 for burning. Alternatively boats 54 may be utilized to pull the oil guide 50 and apparatus 13 through the oil spill until all of the oil is consumed.

It should be understood that the above described embodiment is simply illustrative of the principles of this invention and that numerous other embodiments may be readily devised by those skilled in the art without deviating therefrom. Therefore only the following claims are intended to define this invention.

What is claimed is:

1. Apparatus for preparing a layer of oil, such as an oil spill, for burning on a body of water comprising:
 a multiple of oil burning facilitators;
 each facilitator comprising a rigid silica body having a specific gravity less than water to provide a flame support surface extending above the water surface;
 each facilitator comprised of a plurality of silica closed cell spheres that are bound together in a rigid structure by an adhesive;
 wherein at least one of the facilitators having at least one vertically oriented aperture extending therethrough to define a column cavity to receive a distinct vertical oil column therein;
 each silica body being thermally insulative to minimize heat transfer between the water and the flame support surface to insulate the flame from heating the water and to minimize the formation of steam and to enable the vertical column of oil to be heated to a temperature above 120° F. by a flame above the oil column to vigorously burn the oil in the column and to draw additional oil into the column cavity; and
 means for confining the oil burning facilitators in sufficiently close relationship to each other so that a flame on one facilitator will support combustion on an adjacent facilitator.

2. The apparatus as defined in claim 1 wherein the confining means positions the facilitators in sufficiently close relationship to each other to subdivide the oil layer into additional distinct oil columns between adjacent facilitators which may be heated and burned separately.

3. The apparatus as defined in claim 2 wherein the facilitators have vertical extending side surfaces that form walls for the distinct oil columns wherein said side surfaces are highly porous to enable oil from the oil columns to flow into the adjacent bodies.

4. The apparatus as defined in claim 1 wherein a majority of the facilitator bodies has at least one vertical oriented aperture formed extending therethrough to receive distinct oil columns therein.

5. The apparatus as defined in claim 1 wherein the confining means includes interconnecting means connecting adjacent facilitators to maintain the facilitators in the close relationship to each other.

6. The apparatus as defined in claim 1 wherein several of the facilitators contain highly flammable material to facilitate the initial ignition of the oil layer.

7. The apparatus as defined in claim 6 wherein the highly flammable material is a wax that is solid at ambient temperatures.

8. The apparatus as defined in claim 7 wherein the wax encapsulates the rigid silica body to prevent the body from being contaminated during storage and to provide a highly flammable material on the body to facilitate initial ignition of the oil layer.

9. The apparatus as defined in claim 1 wherein each facilitator has lateral dimensions greater than vertical dimensions to provide floating stability and to minimize heat transfer between the body of water and the oil column.

10. Apparatus for preparing a layer of oil, such as an oil spill, for burning on a body of water comprising:
 a multiple of oil burning facilitators;
 each facilitator comprising a rigid body having a specific gravity less than water to provide a flame support surface extending above the water surface;
 confining means positions the facilitators in sufficiently close relationship to each other to subdivide the oil layer into distinct vertical oil columns between adjacent flame support surfaces to support a flame above the columns and between the flame support surfaces to burn the oil;
 each facilitator being thermally insulative to minimize heat transfer between the water and the flame support surface to insulate the flame from heating the water to minimize the formation of steam and to enable the vertical oil columns to be heated by the flame to a temperature above 120° F. for vigorous burning;
 each facilitator is comprised of a plurality of closed cell silica spheres that are bonded together by a highly porous hydrocarbon adhesive material to permit oil to flow between the spheres through the pores to the flame support surface to feed the flame thereon and to permit the hydrocarbon adhesive material to be carbonized while the oil is being burned to form a crystaline lattice structure between the spheres to enable the facilitators to subsequently decompose by the application of mechanical forces such as wave action.

11. The apparatus as defined in claim 10 wherein each facilitator has lateral dimensions greater than vertical dimensions to provide floating stability and to minimize heat transfer between the body of water and the oil columns.

12. The apparatus as defined in claim 10 wherein a majority of the facilitators have at least one vertically oriented internal aperture extending therethrough to define an internal column cavity to receive a distinct vertical oil column therein to enable the oil in the internal column cavity to be heated to a temperature above 120° F.

* * * * *